United States Patent
Doula et al.

(10) Patent No.: US 11,693,874 B2
(45) Date of Patent: Jul. 4, 2023

(54) FRAMEWORK TO FACILITATE DATA ACCESS

(71) Applicant: SAP SE, Walldorf (DE)

(72) Inventors: Mohamed Doula, Oestringen (DE); Sheena Maria Dias, Bangalore (IN); Kshitiz Shailendra, Bengaluru (IN); Sameer Patra, Bangalore (IN)

(73) Assignee: SAP SE, Walldorf (DE)

( * ) Notice: Subject to any disclaimer, the term of this patent is extended or adjusted under 35 U.S.C. 154(b) by 37 days.

(21) Appl. No.: 17/104,116

(22) Filed: Nov. 25, 2020

(65) Prior Publication Data

US 2022/0164362 A1     May 26, 2022

(51) Int. Cl.
  *G06F 16/2455* (2019.01)
  *G06F 16/25* (2019.01)
  *G06F 16/28* (2019.01)

(52) U.S. Cl.
  CPC ........ *G06F 16/252* (2019.01); *G06F 16/2455* (2019.01); *G06F 16/289* (2019.01)

(58) Field of Classification Search
  CPC .... G06F 16/252; G06F 9/541; G06F 16/2455; G06F 16/289
  USPC ........................................................ 707/709
  See application file for complete search history.

(56) References Cited

U.S. PATENT DOCUMENTS

| | | | |
|---|---|---|---|
| 9,613,117 B1* | 4/2017 | Meritt ................... | G06F 16/196 |
| 10,025,599 B1* | 7/2018 | Goodson ................ | G06F 9/541 |
| 2012/0246202 A1* | 9/2012 | Surtani ................ | G06F 16/258 707/812 |
| 2013/0304799 A1* | 11/2013 | Lutter ................ | G06F 16/2455 709/203 |
| 2015/0120711 A1* | 4/2015 | Liensberger ........ | G06F 16/2452 707/722 |
| 2017/0169068 A1* | 6/2017 | Kennedy, Jr. ......... | G06F 16/245 |
| 2017/0177650 A1* | 6/2017 | Devine ............... | G06F 16/2455 |
| 2019/0158309 A1* | 5/2019 | Park .................... | H04L 12/2832 |
| 2019/0179608 A1* | 6/2019 | Kothari ............... | G06F 16/2365 |
| 2020/0057946 A1* | 2/2020 | Singaraju ............... | G06N 20/00 |

OTHER PUBLICATIONS

Progress Software Corporation, "OData: What's New with REST APIs for Your Database", 2017, 48 pages. (Year: 2017).*

(Continued)

*Primary Examiner* — Scott A. Waldron
(74) *Attorney, Agent, or Firm* — Buckley, Maschoff & Talwalkar LLC

(57) ABSTRACT

Systems and methods include an application programming interface based on a first plurality of object attributes of a data structure, and a framework to update the data structure with a second one or more object attributes and associate the first object type with a first search method. The application programming interface is updated based on the updated data structure, and the framework receives attribute values and the first object type via the updated application programming interface, maps the attribute values to respective ones of the first object attributes and the second object attributes, and identifies and executes the first search method to generate a query of object instances of the first object type.

10 Claims, 9 Drawing Sheets

(56) References Cited

OTHER PUBLICATIONS

Ed-douibi, Hamza, et al., "Model-driven development of OData services: An application to relational databases," 2018 12th International Conference on Research Challenges in Information Science (RCIS), 2018, 12 pages. (Year: 2018).*
Ghosh, Sudip, "SAP CAI Chatbot Integration with ERP just have become Super Easier! for ABAPer", blog post Nov. 10, 2019, 32 pages. (Year: 2019).*
Castaldo, Nicola, "A Conceptual Modeling Approach for the Rapid Development of Chatbots for Conversational Data Exploration", Politecnico di Milano thesis, (2019) 130 pages. (Year: 2019).*
Baez, Marco et al., "Chatbot Integration in Few Patterns", IEEE, published Sep. 18, 2020, 8 pages. (Year: 2020).*

\* cited by examiner

FIG. 7

FRAMEWORK TO FACILITATE DATA ACCESS

BACKGROUND

Enterprise software systems receive, generate, and store data related to many aspects of an enterprise. Client applications may be used to view and analyze such data. For example, a user may manipulate user interfaces of a client application to submit a query for particular data based on specified search criteria. A system storing the data, which may be on-premise, cloud-based, or otherwise deployed, generates a result set based on the query and on the stored data, and returns the result set to the client application for display and/or analysis.

Despite the best intentions of the above paradigm, casual users may experience difficulty in acquiring desired data using conventional client applications. Alternative systems for accessing stored enterprise data are therefore desired. Chatbot applications, for example, may provide an intuitive and easy-to-use interface for accessing particular stored data.

A chatbot or other client application typically calls a backend-provided service to submit a request for data. This service is created by a developer in view of the structure of the requested data and the data schema under which the data is stored. Creation of a separate service for each data type may consume unacceptable amounts of time and resources.

BRIEF DESCRIPTION OF THE DRAWINGS

FIG. 7 is a view of a configuration user interface for assigning custom attributes to an object type according to some embodiments.

DETAILED DESCRIPTION

The following description is provided to enable any person in the art to make and use the described embodiments. Various modifications, however, will remain readily-apparent to those in the art.

Some embodiments provide a framework to facilitate support for queries of various types of data object. These queries may comprise natural language queries in some embodiments. A data object may be considered a hierarchical structure of attributes, and an instance of such a data object comprises a set of data values corresponding to the attributes and conforming to the hierarchical structure. A data object may be defined by metadata and data object instances may be stored, for example, within database tables. In a simple example, the values of a data object instance are stored within a row of a database table, where the columns of the database table correspond to attributes of the data object type of which the stored data object is an instance.

According to some embodiments, one type of data object may share attributes with one or more other types of data objects. For example, a purchase order, a sales contract, and an invoice object type may each comprise a Creation Date attribute and a Created By attribute. The purchase order object type may also include an Approved By attribute which is not included in the sales contract or invoice object types.

Moreover, methods for querying stored object instance data may vary among object types. In this regard, object instance data of different object types may be stored in different database tables which are interrelated in different manner, and may be subject to different calculations based on different underlying data. Methods for searching and retrieving different object instance data may therefore vary among different object types.

Embodiments may therefore provide a common framework and reusable application programming interface defining default object attributes and default search methods, as well as a mechanism to efficiently augment the default object attributes with attributes and search methods which are specific to various object types. The framework and reusable application programming interface may ease the work of customers and application developers to build client applications (e.g., chatbots) for querying object instances having specific custom attributes.

Figure 1:
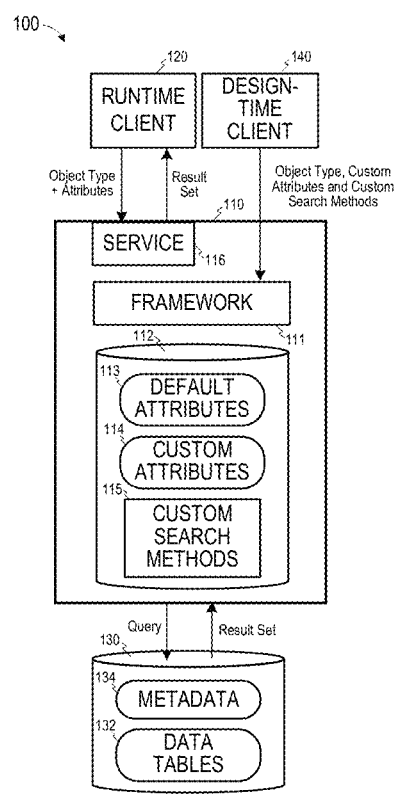
FIG. 1 is a block diagram of a system implementing a framework to facilitate data access according to some embodiments.

FIG. 1 illustrates system 100 according to some embodiments. The illustrated elements of system 100 may be implemented using any suitable combination of computing hardware and/or software that is or becomes known. In some embodiments, two or more elements of system 100 are implemented by a single computing device. One or more elements of system 100 may be implemented as a cloud service (e.g., Software-as-a-Service, Platform-as-a-Service).

System 100 may facilitate object type-specific data access according to some embodiments. Generally, application server 110 provides runtime client 120 with access to data stored in data storage 130. Data storage 130 may implement any database technology that is or becomes known, and may comprise any combination m local or distributed volatile memory (e.g., Random Access Memory (RAM)) and non-volatile memory (e.g., fixed disk, Flash memory, non-volatile (RAM)).

Application server 110 provides services for executing server applications. For example, a Web application executing on application server 110 may receive HyperText Transfer Protocol (HTTP) requests from runtime client 120 and return data from data storage 130 in response thereto. Runtime client 120 may comprise any suitable client application that is or becomes known. In some embodiments, runtime client 120 is a Web browser which communicates with a Web server provided by application server 110. The Web browser may execute a Web application downloaded from application server 110 as is known in the art. Runtime client 120 may comprise a dedicated client application for communicating with a corresponding server application executed by application server 110.

As shown, runtime client 120 provides an object type and attributes to service 116 of application server 110. For example, service 116 may implement an application programming interface which is called by runtime client 120 to pass the object type and attributes to application server 110. The object type specifies a type of object (e.g., purchase order, invoice) and the attributes specify search parameters (e.g., created before xx/xx/xxxx, Purchaser=xxxxxxx). That is, the transmission of an object type and attributes by runtime client 120 to application server 110 comprises a request for instances of the specified object type which conform to the specifies attributes. Although examples herein relate to object types in the procurement domain, embodiments may extend to any other domain.

Service 116 provides the object type and attributes to framework 111. Framework 111 may comprise processor-executable program code to map the provided attributes to default attributes 113 and custom attributes 114. Framework 111 also determines whether the identified object type corresponds to a custom search method of custom search methods 116. If not, framework 111 identifies a default search method of default search methods 115. Framework 111 then executes the identified custom or default search method to generate a query which is passed to data storage 130.

According to some embodiments, service 116 is an application programming interface or OData service whose metadata/interface has a predefined-structure of default object attributes which are delivered with framework 111 to a customer. Also delivered with framework are default search methods for use in generating queries based on received attributes. Framework 111 allows design-time customization of the default object attributes to include custom attributes and also provides a mechanism to define and use object type-specific custom search methods instead of the default search methods.

Data storage 130, which may comprise a database system or any other query-responsive storage, executes the query as known in the art, based on metadata 134 describing the structure and interrelations (i.e., the schema) of data stored within data tables 132. Data storage 130 returns the result set to application server 110, which passes the result set, with or without additional processing, to runtime client 120.

The foregoing process leverages design-time features provided by some embodiments. More specifically, and prior to runtime, a developer, key user, or other user operates design-time client 140 to access configuration functions of framework 111. Although framework 111 is described herein as providing runtime and design-time functionality, such functionality may be provided by separate components according to some embodiments. As described above, design-time client 140 may comprise a Web browser which communicates, by executing a Web application or otherwise, with a Web server provided by application server 110, or a dedicated client application for communicating with a corresponding server application executed by application server 110.

Design-time client 140 is operated to provide, for each of one or more object types, one or more custom attributes 114 and/or custom search methods 116 to application server 110. Framework 111 stores default attributes 113, custom attributes 114, default search methods 115 and custom search methods 116. Each of custom search methods 116 may be stored in association with one or more respective object types. Accordingly, in response to reception of an object type during runtime as described above, framework 111 may determine, based on custom search methods 116, a search method associated with the object type.

A custom attribute may be added to custom attributes 114 at design-time to support queries of a particular object type. According to some embodiments, the interface of service 116 is updated upon saving of new attributes to custom attributes 114. The updated interface is the same for all object types, and is therefore usable by runtime client 120 to query object instances of all object types based on any custom attributes 114.

Each of systems 110, 120, 130 and 140 may comprise any suitable combination of hardware and/or software. Any components described herein may be implemented using a distributed storage system and/or distributed nodes for performing computing operations as is known in the art.

Figure 2:
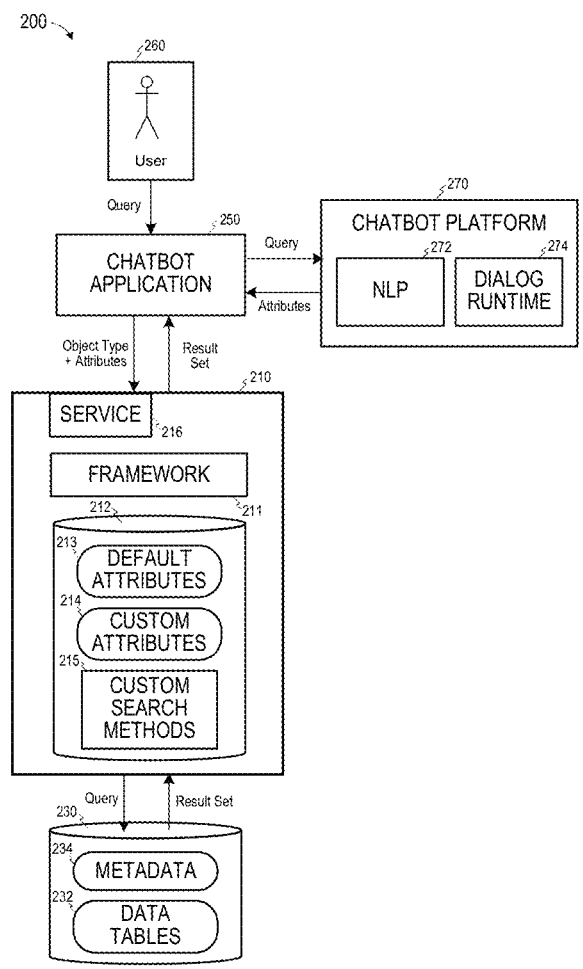
FIG. 2 is a block diagram of a system implementing a framework to facilitate data access by a chatbot application according to some embodiments.

FIG. 2 illustrates system 200 according to some embodiments. Application server 210 of system 200 includes components similar to the similarly-numbered components of application server 110. Data storage 230 may also comprise an implementation similar to those described above with respect to data storage 130.

In contrast to system 100 of FIG. 1, service 216 of application server 210 receives an object type and attributes from chatbot application 250. Chatbot application 250 may reside on a local computing system of user 250 or may be executed on a remote server, with interfaces thereof being presented on the local computing system via HTTP.

Chatbot application 250 is developed based on chatbot platform 270, as is also known in the art. Chatbot platform may reside remote from chatbot application 250, for example as a cloud-based service. Embodiments are not limited thereto.

Chatbot application 250 receives a query (e.g., a natural language query) from user 260 via, e.g., a chat interface. Chatbot application 250 passes the query to chatbot platform 270. Natural language processing component 272 of chatbot platform 270 analyzes the natural language query and resolves the intents and entities present in the query. Resolution of the intents and entities may be performed using a neural network trained via machine learning as is known in the art and supported by conventional natural language processing platforms. The intents and entities are resolved into query attributes which are then provided to chatbot application 250.

Chatbot application 250 then transmits the attributes and an object type to application server 210 via service 216. According to some embodiments, chatbot application 250 generates a Uniform Resource Locator (URL) based on the object type, the attributes and a URL of service 216. The URL may comprise an OData query according to some embodiments. Chatbot application 250 may then transmit an HTTP request including the URL, which is received by service 216.

Service 216 provides the object type and attributes to framework 211. Framework 211 maps the attributes received by service 216 to default attributes 213 and any custom attributes 214. Framework 211 transmits the mapped attributes to a default search method 215, unless the object type is associated with a custom search method 216, in which case the mapped attributes are provided to the identified custom search method.

The search method may generate the query based on metadata 234 as well as on the object type and mapped attributes. The generated query, which may comprise a Structured Query Language query, is passed to data storage 230 for execution. Data storage 230 executes the query as known in the art based on metadata 232 and returns a result set from data tables 232 to application server 210. The result set is then returned to chatbot application 250, which may display all or a portion of the result set in any suitable manner.

Figure 3:
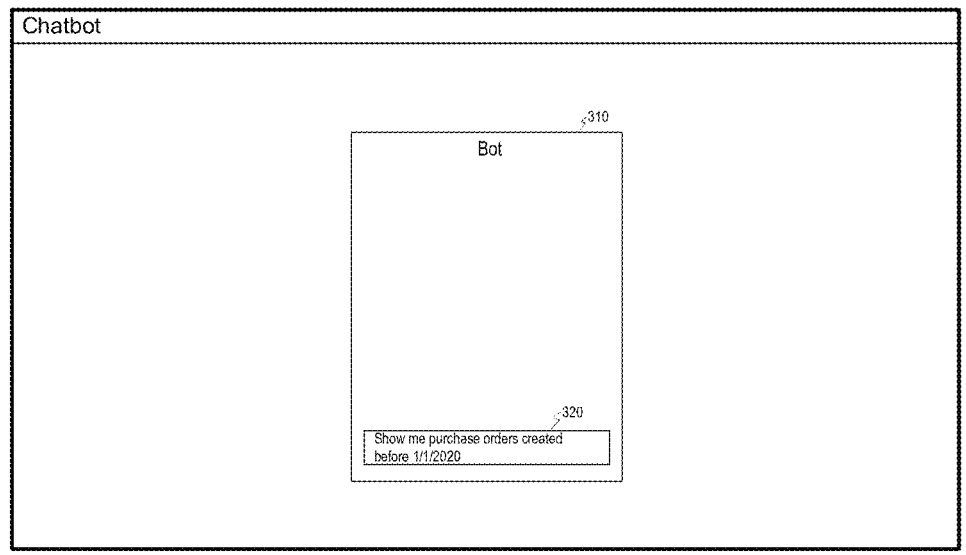
FIG. 3 is a view of a chatbot application user interface according to some embodiments.
Figure 4:
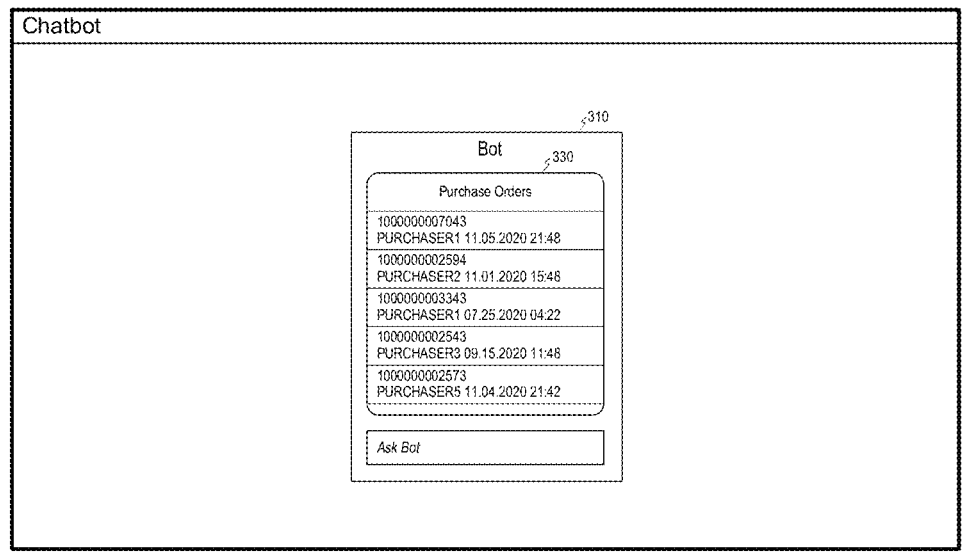
FIG. 4 is a view of a chatbot application user interface displaying search results according to some embodiments.
Figure 5:
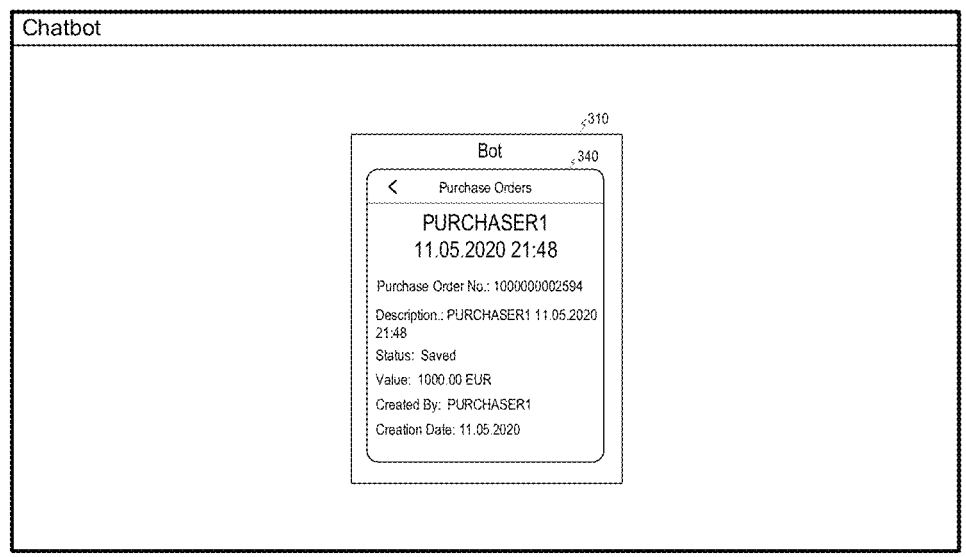
FIG. 5 is a view of a chatbot application user interface displaying details of a search result according to some embodiments.

FIGS. 3 through 5 are example views of chatbot user interfaces according to some embodiments. Embodiments are not limited to the illustrated user interfaces nor to chatbot applications generally.

FIG. 3 is a view of chatbot user interface 300 according to some embodiments. User interface 300 may comprise a Web page provided by chatbot application 250 to a Web browser for display on a local system of user 260.

User interface 300 includes window 310 and input field 320. A user may input a natural language query into field 320 in any suitable manner, including but not limited to keyboard, voice, drop-down fields. Chatbot application 250 may include an auto-suggestion/auto-complete function to facilitate input of the natural language query. In the illustrated example, the input query is "Show me purchase orders created after Jan. 1, 2020".

As mentioned above, and in response to entry of the query, a component of the chatbot platform (or, in some embodiments, the chatbot application itself) analyzes the query and determines attributes therefrom (e.g., Creation Date>Jan. 1, 2020). Examples are not limited to a single attribute and may include multiple attributes and conditions based on multiple attributes.

The attributes and corresponding object type (e.g., purchase order) are transmitted to a backend system for data retrieval based thereon. For example, the chatbot application may call an OData service of an application server to pass the object type and attributes thereto. The application uses the object type and attributes to determine and call a search method which generates a query for retrieving the requested data from a data storage system. A result set including the data is retrieved and is returned to the chatbot application. The result set is structured based on the structure defined by the default and custom attributes. of the framework.

In the present example, the result set includes information regarding each of a plurality of purchase order object instances. FIG. 4 shows window 310 presenting search results 330. Search results 330 includes identifying information of each (or a subset) of the object instances retrieved from the data storage system. According to some embodiments, the user may select one of the displayed object instances to view further data associated with the selected object instance.

FIG. 5 illustrates interface 300 and window 310 after selection of the first object instance of search results 330. Detail window 340 includes additional data associated with the selected object instance. The displayed additional data may have been returned to the chatbot application within the result set in response to the natural language query as described above. Alternatively, selection of the first object instance of search results 330 may trigger a second request from the chatbot application to the application server for additional data associated with the first object instance, which is then received and displayed by the chatbot application.

Figure 6:
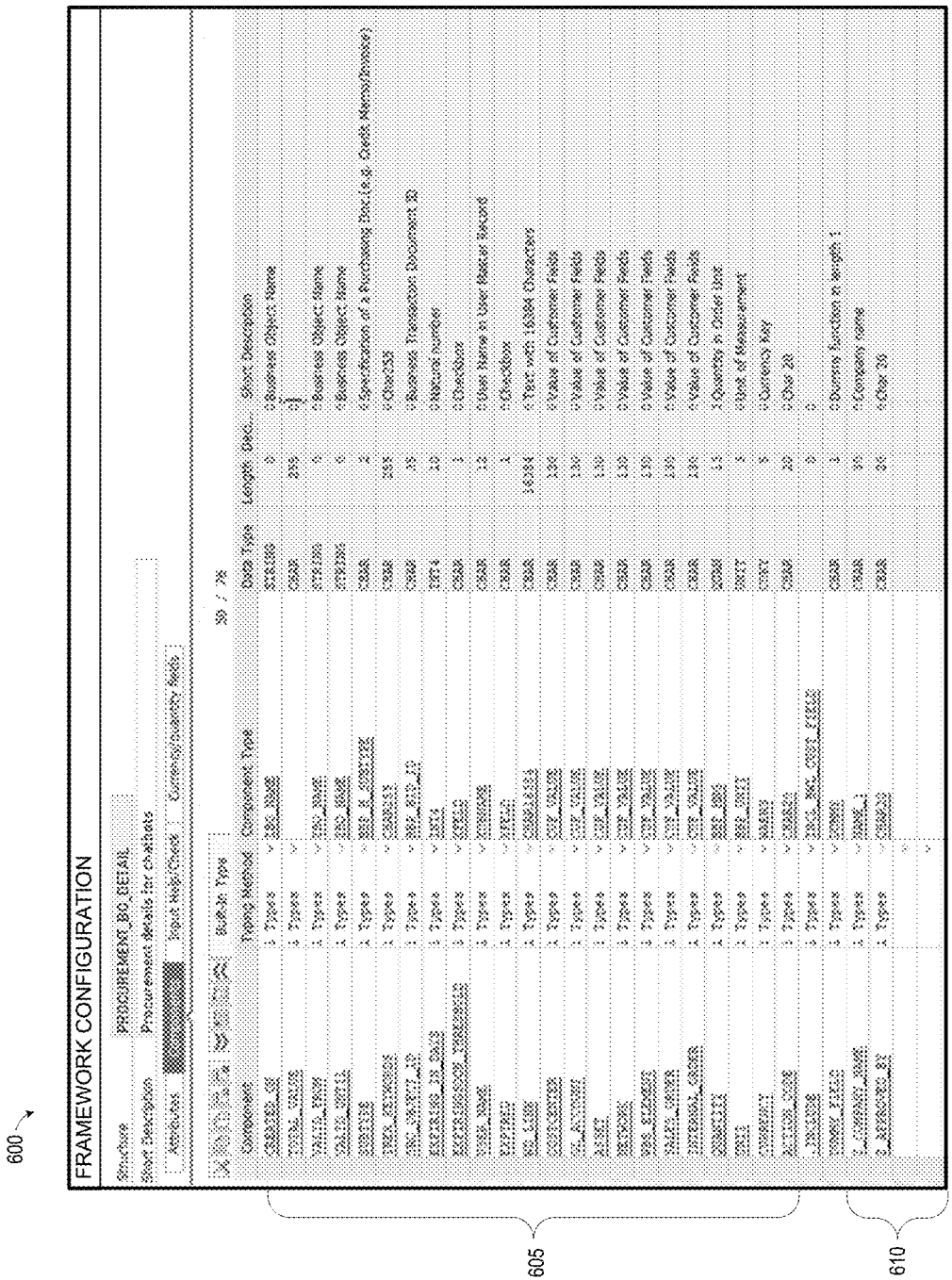
FIG. 6 is a view of a configuration user interface for defining custom attributes according to some embodiments.
Figure 8:
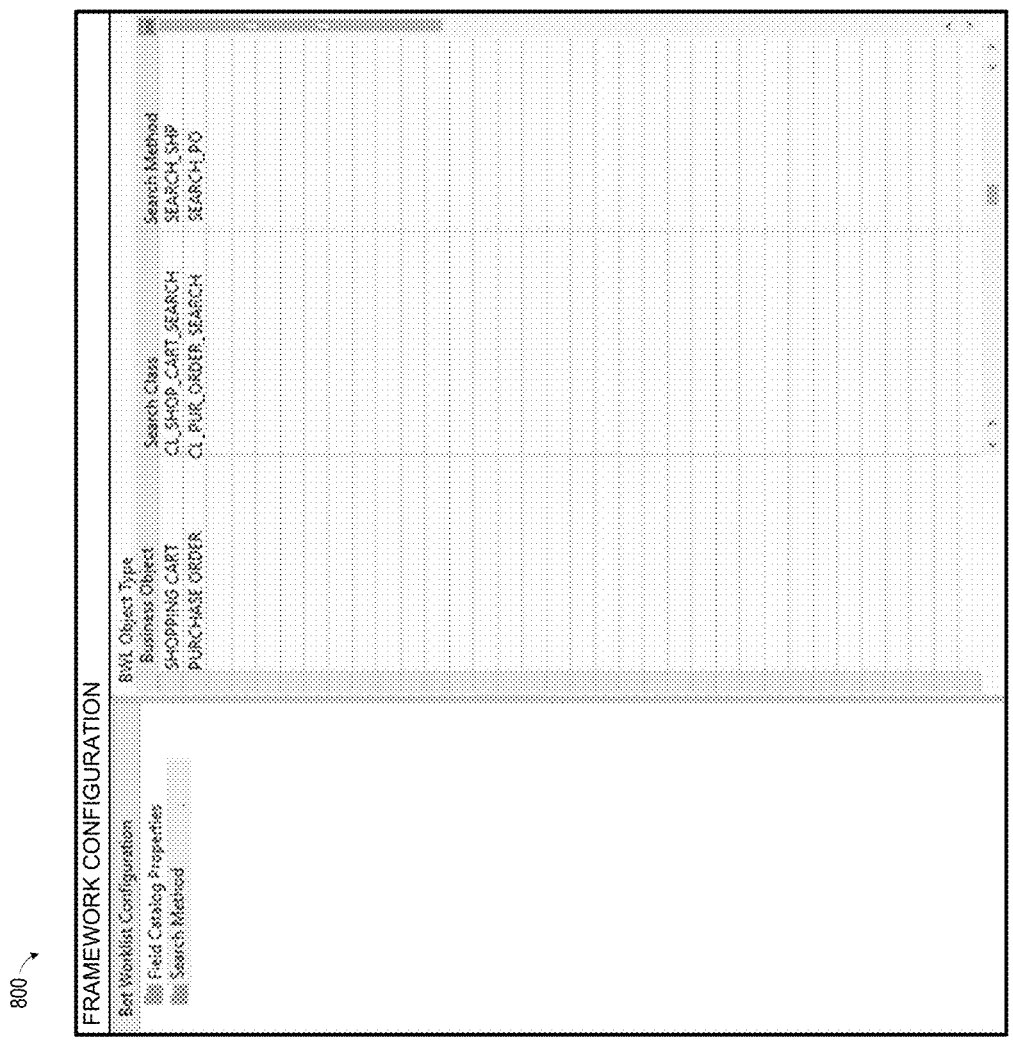
FIG. 8 is a view of a configuration user interface for assigning a custom search method to an object type according to some embodiments.

FIG. 6 is a view of design-time configuration interface 600 according to some embodiments. Interface 600 may comprise a client interface of a server application provided to design-time client 140 of system 100.

According to some embodiments, a service such as service 116 is an OData service having an interface provided with common search attributes of various object types. The entity of this service may be defined by a standard structure delivered to customers which contains these common search attributes. Interface 600 depicts search attributes 605 of such a standard structure named "PROCUREMENT_BO_DETAIL". This structure may be consumed by service 116 during runtime to search for any object instances of object types associated with procurement, such as purchase order or purchase contact object types. Similarly, service 116 may use the structure to return requested data to a runtime client.

Interface 600 of FIG. 6 also shows custom attributes 610 added to the standard structure during design-time according to some embodiments. Custom attributes 610 may be added to support one or more particular object types but may be used by all object types. Customization may include enhancement of the common search attributes of a standard (e.g., pre-delivered) structure as shown in FIG. 6. In particular, the structure "PROCUREMENT_BO_DETAIL" has been enhanced with custom attributes "Z_COMPANY_NAME" and "Z_APPROVED_BY".

Figure 7:
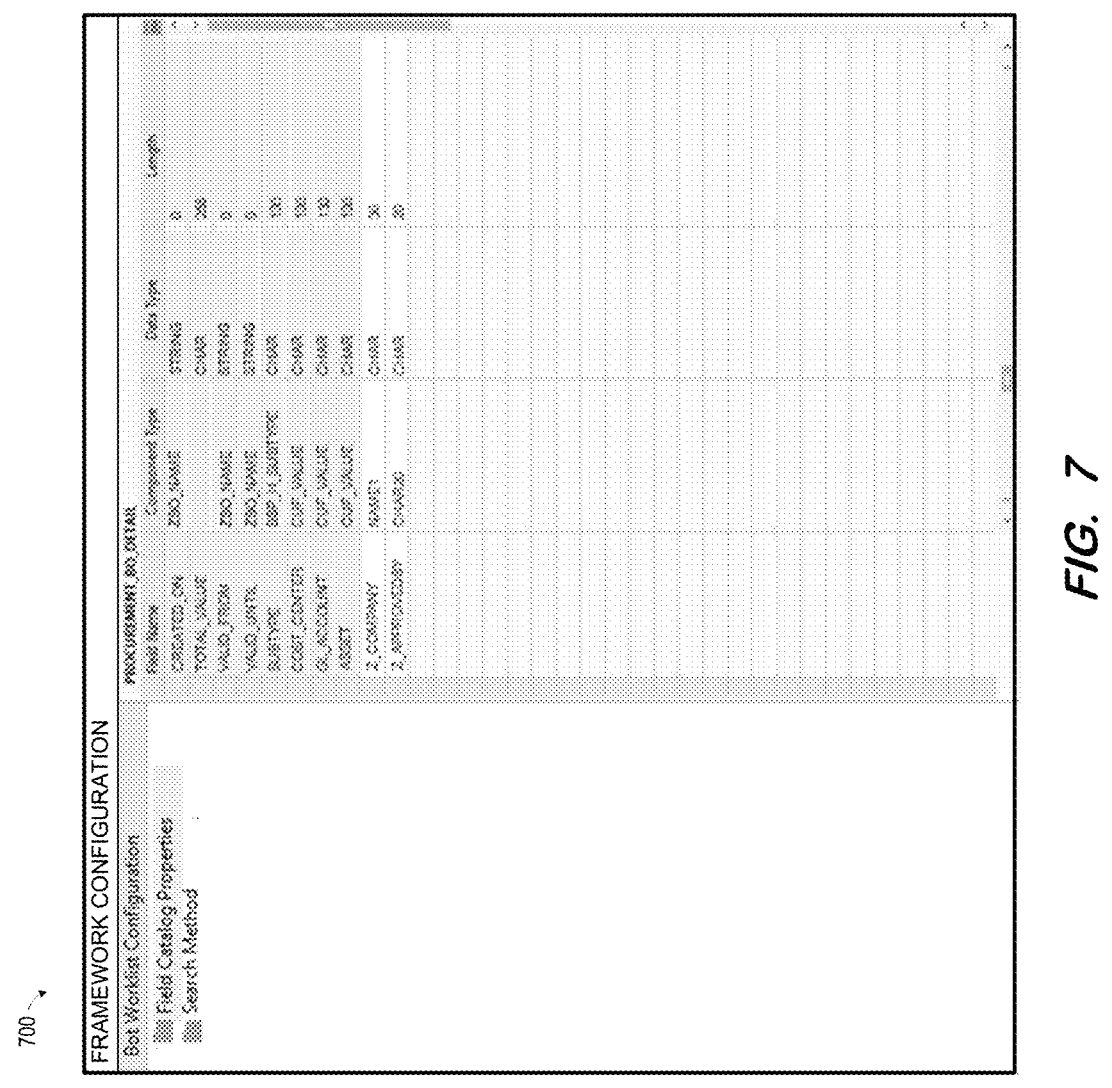

Similarly, the standard delivered structure can be enhanced via the field catalog. FIG. 7 illustrates design-time user interface 700 for viewing and editing a field catalog according to some embodiments. As shown, interface 700 displays all attributes (i.e., fields) maintained in structure "PROCUREMENT_BO_DETAIL". The field catalog of structure "PROCUREMENT_BO_DETAIL" has been enhanced with custom attributes "Z_COMPANY_NAME" and "Z_APPROVED_BY". Embodiments are not limited to two custom attributes. According to some embodiments, the default attributes cannot be changed and only custom attributes can be changed or added.

Once the changed field catalog is saved, framework 111 may update structure "PROCUREMENT_BO_DETAILS" with the new/updated custom attributes. Framework 111 also updates the ODATA service based on these changes. In particular, an application programming interface is implemented based on the updated structure. Next, the customer/application developer may implement a custom search method for one or more object types based on the attribute structure (default+custom).

Figure 9:
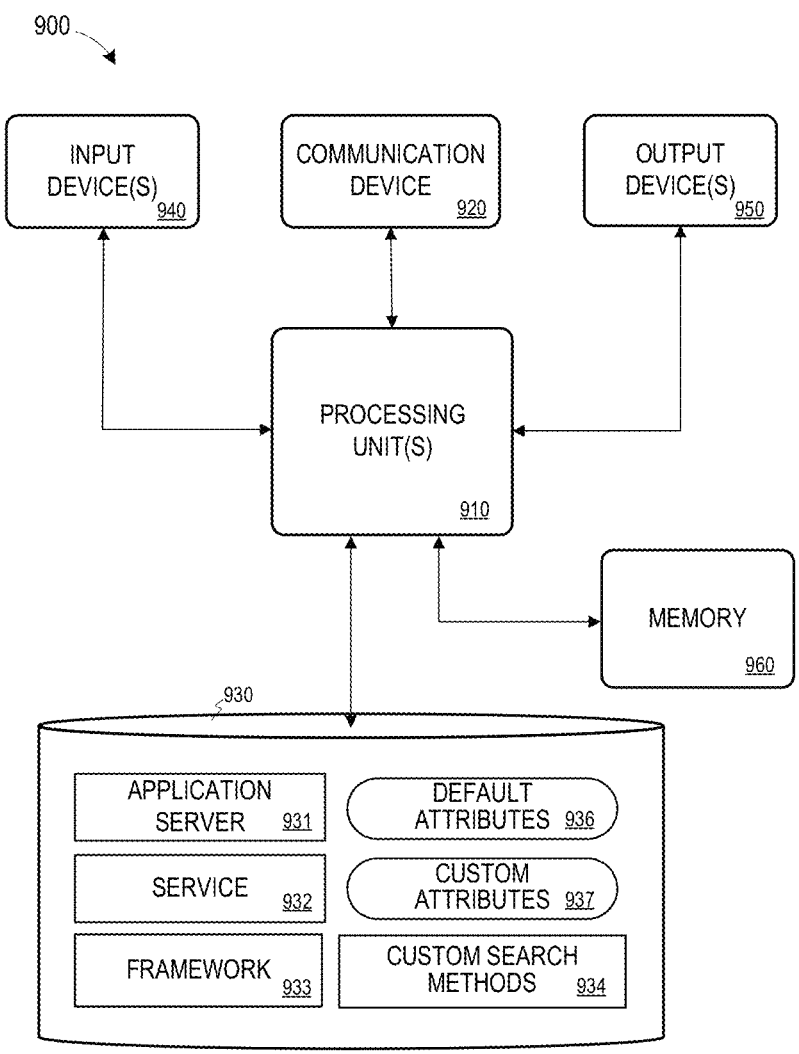
FIG. 9 is a block diagram of a computing system implementing a framework according to some embodiments.

FIG. 9 is a block diagram of computing system 900 providing an application platform according to some embodiments. Computing system 900 may comprise one or more general-purpose computing apparatuses, distributed server nodes, or the like, and may execute program code to perform any of the functions described herein. Computing system 900 may comprise an implementation of application platform 110 in some embodiments. Computing system 900 may include other unshown elements according to some embodiments.

Computing system 900 includes processing unit(s) 910 operatively coupled to communication device 920, data storage device 930, one or more input devices 940, one or more output devices 950 and memory 960. Communication device 920 may facilitate communication with external devices, such as an external network, the cloud, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into system 900. Output device(s) 950 may comprise, for example, a display (e.g., a display screen) a speaker, and/or a printer.

Data storage device 930 may comprise any appropriate persistent storage device, including combinations (distributed or otherwise) of magnetic storage devices (e.g., magnetic tape, hard disk drives and flash memory), optical storage devices, Read Only Memory (ROM) devices, and RAM devices, while memory 960 may comprise a RAM device.

Application server 931, service 932, framework 933, and custom search methods 934 may each comprise program code executed by processing unit(s) 910 to cause system 900 to perform any one or more of the processes described herein. Embodiments are not limited to execution of these processes by a single computing device. Default attributes 936 may comprise attributes of a standard (e.g., pre-delivered) data structure based on which a service 932 is generated, and custom attributes 937 may be combined with default attributes 936 within a customized structure which is then used to generate a service 932 capable of receiving the default and custom attributes and returning corresponding result sets. Data storage device 934 may also store data and other program code for providing additional functionality and/or which are necessary for operation of computing system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a data storage storing a data structure comprising a first plurality of object attributes; and
an application server to implement:
an application programming interface generated based on the first plurality of object attributes;
a framework to:
receive a first user command to update the data structure with a second one or more object attributes;
receive a second user command to associate a first object type with a first search method;
in response to the first user command, update the application programming interface based on the first plurality of object attributes and the second one or more object attributes; and
a chatbot application to:
receive a query from a user and to transmit the query to a chatbot platform;
receive attribute values of the first plurality of object attributes and the second one or more object attributes from the chatbot platform in response to transmission of the query;
determine the first object type based on the query; and
transmit an indicator of the first object type and the attribute values received from the chatbot platform via the updated application programming interface,
the framework further to:
receive the attribute values and the indicator of the first object type from the chatbot application via the updated application programming interface; and
in response to receipt of the attribute values and the indicator of the first object type via the updated application programming interface:
map the attribute values to respective ones of the first plurality of object attributes and the second one or more object attributes;
identify the first search method as associated with the first object type; and
execute the first search method to generate a query for object instances of the first object type and associated with the attribute values mapped to respective ones of the first plurality of object attributes and the second one or more object attributes.

2. The system according to claim 1, wherein the query is to be transmitted to the data storage, a result set is to be received from the data storage in response to the query, and the result set is to be transmitted to the chatbot application via the updated application programming interface.

3. The system according to claim 1, the framework to operate to:
receive a third user command to update the data structure with a third one or more object attributes;
receive a fourth user command to associate a second object type with a second search method;
in response to the third user command, update the application programming interface to a second updated application programming interface based on the first plurality of object attributes, the second one or more object attributes, and the third one or more object attributes;
receive second attribute values and an indicator of the second object type from a second chatbot application via the second updated application programming interface; and
in response to receipt of the second attribute values and the indicator of the second object type via the second updated application programming interface:
map the second attribute values to respective ones of the first plurality of object attributes and the third one or more object attributes;
identify the second search method as associated with the second object type; and
execute the second search method to generate a query for object instances of the second object type and associated with the second attribute values mapped to respective ones of the first plurality of object attributes and the third one or more object attributes.

4. A computer-implemented method, comprising:
in response to received user commands:
updating a data structure comprising a first plurality of object attributes with a second one or more object attributes;
associating a first object type with a first search method; and
in response to updating of the data structure, updating an application programming interface based on the updated data structure;

executing a chatbot application to:
   receive a query from a user and to transmit the query to a chatbot platform;
   receive attribute values of the first plurality of object attributes and the second one or more object attributes from the chatbot platform in response to transmission of the query;
   determine the first object type based on the query; and
   transmit an indicator of the first object type and the attribute values received from the chatbot platform via the updated application programming interface;
receiving the attribute values and the indicator of the first object type from the chatbot application via the updated application programming interface; and
in response to receiving the attribute values and the indicator of the first object type via the updated application programming interface:
   mapping the attribute values to respective ones of the first plurality of object attributes and the second one or more object attributes;
   identifying the first search method as associated with the first object type; and
   executing the first search method to generate a query for object instances of the first object type and associated with the attribute values mapped to respective ones of the first plurality of object attributes and the second one or more object attributes.

5. The method according to claim 4, further comprising:
transmitting the query to a data storage;
receiving a result set from the data storage in response to the query; and
transmitting the result set to the chatbot application via the updated application programming interface.

6. The method according to claim 4, further comprising:
in response to received second user commands:
   updating the data structure comprising the first plurality of object attributes and the second plurality of object attributes with a third one or more object attributes;
   associating a second object type with a second search method; and
   in response to updating of the data structure with the third one or more object attributes, updating the updated application programming interface to a second updated application programming interface based on the data structure comprising the first plurality of object attributes, the second plurality of object attributes and the third one or more object attributes;
receiving second attribute values and an indicator of the second object type from a second chatbot application via the second updated application programming interface; and
in response to receiving the second attribute values and the indicator of the second object type via the second updated application programming interface:
   mapping the second attribute values to respective ones of the first plurality of object attributes and the third one or more object attributes;
   identifying the second search method as associated with the second object type; and
   executing the second search method to generate a second query for object instances of the second object type and associated with the attribute values mapped to respective ones of the first plurality of object attributes and the third one or more object attributes.

7. A system comprising:
a memory storing processor-executable program code;
a processing unit to execute the processor-executable program code to cause the system to:
in response to received user commands:
   update a data structure comprising a first plurality of object attributes with a second one or more object attributes;
   associate a first object type with a first search method; and
   in response to updating of the data structure, update an application programming interface based on the updated data structure;
executing a chatbot application to:
   receive a query from a user and to transmit the query to a chatbot platform;
   receive attribute values of the first plurality of object attributes and the second one or more object attributes from the chatbot platform in response to transmission of the query;
   determine the first object type based on the query; and
   transmit an indicator of the first object type and the attribute values received from the chatbot platform via the updated application programming interface;
receive attribute values and the indicator of the first object type from the chatbot application via the updated application programming interface; and
in response to receiving the attribute values and the indicator of the first object type via the updated application programming interface:
   map the attribute values to respective ones of the first plurality of object attributes and the second one or more object attributes;
   identify the first search method as associated with the first object type; and
   execute the first search method to generate a query of object instances of the first object type.

8. The system according to claim 7, the processing unit to execute the processor-executable program code to cause the system to:
transmit the query to a data storage;
receive a result set from the data storage in response to the query; and
transmit the result set to the chatbot application via the updated application programming interface.

9. The system according to claim 7, the processing unit to execute the processor-executable program code to cause the system to:
in response to received second user commands:
   update the data structure comprising the first plurality of object attributes and the second plurality of object attributes with a third one or more object attributes;
   associate the second object type with a second search method; and
   in response to updating the data structure, update the updated application programming interface to a second updated application programming interface based on the updated data structure comprising the first plurality of object attributes, the second plurality of object attributes and the third one or more object attributes;
receive second attribute values and an indicator of the second object type from a second chatbot application via the second updated application programming interface; and in response to receipt of the second attribute values and the indicator of the second object type from the second chatbot application via the second updated application programming interface:
   map the second attribute values to respective ones of the first plurality of object attributes and the third one or more object attributes;
   identify the second search method as associated with the second object type; and
   execute the second search method to generate a second query for object instances of the second object type and associated with the second attribute values mapped to respective ones of the first plurality of object attributes and the third one or more object attributes.

10. A non-transitory computer-readable medium storing program code, the program code executable by a processing unit of a computing system to cause the computing system to:
   in response to received user commands:
      update a data structure comprising a first plurality of object attributes with a second one or more object attributes;
      associate a first object type with a first search method; and
      in response to updating of the data structure, update an application programming interface based on the data structure comprising the first plurality of object attributes and the second one or more object attributes;
   execute a chatbot application to:
      receive a query from a user and to transmit the query to a chatbot platform;
      receive attribute values of the first plurality of object attributes and the second one or more object attributes from the chatbot platform in response to transmission of the query;
      determine the first object type based on the query; and
      transmit an indicator of the first object type and the attribute values received from the chatbot platform via the updated application programming interface;
   receive attribute values and the indicator of the first object type from the chatbot application via the updated application programming interface; and
   in response to receiving the attribute values and the indicator of the first object type via the updated application programming interface:
      map the attribute values to respective ones of the first plurality of object attributes and the second one or more object attributes;
      identify the first search method as associated with the first object type; and
      execute the first search method to generate a query for object instances of the first object type and associated with the attribute values mapped to respective ones of the first plurality of object attributes and the second one or more object attributes.

* * * * *